US011758100B2

(12) United States Patent
Armand et al.

(10) Patent No.: US 11,758,100 B2
(45) Date of Patent: Sep. 12, 2023

(54) PORTABLE PROJECTION MAPPING DEVICE AND PROJECTION MAPPING SYSTEM

(71) Applicant: The Johns Hopkins University, Baltimore, MD (US)

(72) Inventors: Mehran Armand, Fulton, MD (US); Shuya Liu, Baltimore, MD (US); Wei-Lun Huang, Baltimore, MD (US); Austin Shin, San Jose, CA (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 17/753,074

(22) PCT Filed: Sep. 9, 2020

(86) PCT No.: PCT/US2020/070507
§ 371 (c)(1),
(2) Date: Feb. 17, 2022

(87) PCT Pub. No.: WO2021/051126
PCT Pub. Date: Mar. 18, 2021

(65) Prior Publication Data
US 2022/0321851 A1    Oct. 6, 2022

Related U.S. Application Data

(60) Provisional application No. 62/898,913, filed on Sep. 11, 2019.

(51) Int. Cl.
*G06T 7/80* (2017.01)
*H04N 9/31* (2006.01)
(Continued)

(52) U.S. Cl.
CPC ............. *H04N 9/3185* (2013.01); *G06T 7/85* (2017.01); *G06V 10/143* (2022.01);
(Continued)

(58) Field of Classification Search
CPC ........... G06T 7/85; G06T 15/08; G06T 15/10; G06T 2207/10012; G06T 2207/30204
See application file for complete search history.

(56) References Cited

U.S. PATENT DOCUMENTS 7,471,973 B2 * 12/2008 Rudy .................... A61B 5/287
                                                            600/407
11,270,443 B2 * 3/2022 LeGaye ................. G06T 17/20
(Continued)

FOREIGN PATENT DOCUMENTS

EP             2881702 B1    12/2018

OTHER PUBLICATIONS

International Search Report and Written Opinion—PCT/US2020/070507—ISA/RU—dated Nov. 26, 2020.

*Primary Examiner* — Brian P Yenke
(74) *Attorney, Agent, or Firm* — Harrity & Harrity, LLP

(57) ABSTRACT

A device may provide, to a camera and a projector of a portable projection mapping device, first instructions for calibrating the camera and the projector, and may receive, based on the first instructions, calibration parameters for the camera and the projector. The device may calculate a stereo calibration between the camera and the projector based on the calibration parameters, and may provide, to the camera, second instructions for recognizing a reference instrument associated with the portable projection mapping device. The device may receive, based on the second instructions, binocular images, and may determine additional parameters based on the binocular images. The device may determine recognition parameters for recognizing the reference instru-
(Continued)

Portable projection mapping device

Target object

145
Provide, to the portable projection mapping device, the overlay visualization data to cause the portable projection mapping device to project a visualization on a target object

150
Utilize the recognition parameters for recognizing the digitizing probe to enable a user to interact with the visualization Projection mapping system ment, based on the binocular images and the additional parameters. The device may process the recognition parameters and the stereo calibration, with an optical tracking model, to generate and provide overlay visualization data to the portable projection mapping device.

20 Claims, 10 Drawing Sheets

(51) Int. Cl.
  G06V 10/143 (2022.01)
  G06V 20/64 (2022.01)
(52) U.S. Cl.
  CPC . H04N 9/3194 (2013.01); *G06T 2207/10012* (2013.01); *G06T 2207/30204* (2013.01); G06V 20/64 (2022.01)

(56) References Cited

U.S. PATENT DOCUMENTS

| | | |
|---|---|---|
| 2007/0297695 A1 | 12/2007 | Aratani et al. |
| 2010/0245684 A1 | 9/2010 | Xiao et al. |
| 2014/0078260 A1* | 3/2014 | Taubin ............... G06T 7/80 348/46 |
| 2014/0368640 A1 | 12/2014 | Strandemar et al. |
| 2015/0097931 A1* | 4/2015 | Hatzilias ............. G06T 7/85 348/50 |
| 2016/0163031 A1* | 6/2016 | Gordon ............. G06T 15/205 348/46 |
| 2016/0259993 A1* | 9/2016 | Ulbricht ............. G06T 7/33 |
| 2021/0166412 A1* | 6/2021 | Wirth ............. G01B 11/2545 |
| 2022/0323874 A1* | 10/2022 | Jeromin ............. G06T 7/73 |

* cited by examiner

PORTABLE PROJECTION MAPPING DEVICE AND PROJECTION MAPPING SYSTEM

RELATED APPLICATION

This application is a 371 national stage of PCT Application PCT/US2020/070507 filed on Sep. 9, 2020, entitled "PORTABLE PROJECTION MAPPING DEVICE AND PROJECTION MAPPING SYSTEM," which claims priority to U.S. Provisional Patent Application No. 62/898,913, filed on Sep. 11, 2019, entitled "PORTABLE PROJECTION MAPPING DEVICE FOR PROVIDING SPATIAL AND TEMPORAL MAPPING OF IMAGES AND/OR VIDEOS," both of which are hereby expressly incorporated by reference herein.

BACKGROUND

Projection mapping, also known as video mapping or spatial augmented reality, is a projection technology that converts three-dimensional (3D) objects in space into a display target for projectors. Projection mapping may be used to turn objects, often irregularly shaped, into a display surface for video projection. By using specialized software, a two-dimensional or three-dimensional object may be spatially mapped on a virtual program that mimics a real environment on which the virtual program is to be projected.

SUMMARY

In some implementations, a method may include providing, to a camera and a projector of a portable projection mapping device, first instructions for calibrating the camera and the projector, and receiving, from the camera and the projector and based on the first instructions, calibration parameters for the camera and the projector. The method may include calculating a stereo calibration between the camera and the projector based on the calibration parameters for the camera and the projector, and providing, to the camera, second instructions for recognizing a reference instrument and a digitizing probe associated with the portable projection mapping device. The method may include receiving, from the camera and based on the second instructions, binocular images, and determining a marker extraction, a marker matching, a three-dimensional coordinate reconstruction of markers, a model fitting, and a three-dimensional registration, based on the binocular images. The method may include determining recognition parameters for recognizing the reference instrument and the digitizing probe, based on the binocular images, the marker extraction, the marker matching, the three-dimensional coordinate reconstruction of markers, the model fitting, and the three-dimensional registration. The method may include processing the recognition parameters for recognizing the reference instrument and the stereo calibration between the camera and the projector, with an optical tracking model, to generate overlay visualization data, and providing, to the portable projection mapping device, the overlay visualization data.

In some implementations, a device may include one or more memories, and one or more processors to provide, to a camera and a projector of a portable projection mapping device, first instructions for calibrating the camera and the projector, and receive, from the camera and the projector and based on the first instructions, calibration parameters for the camera and the projector. The one or more processors may calculate a stereo calibration between the camera and the projector based on the calibration parameters for the camera and the projector, and may provide, to the camera, second instructions for recognizing a reference instrument and a digitizing probe associated with the portable projection mapping device. The one or more processors may receive, from the camera and based on the second instructions, binocular images, and may determine one or more of a marker extraction, a marker matching, a three-dimensional coordinate reconstruction of markers, a model fitting, or a three-dimensional registration, based on the binocular images. The one or more processors may determine recognition parameters for recognizing the reference instrument and the digitizing probe, based on the binocular images, the marker extraction, the marker matching, the three-dimensional coordinate reconstruction of markers, the model fitting, and the three-dimensional registration, and may process the recognition parameters for recognizing the reference instrument and the stereo calibration between the camera and the projector, with an optical tracking model, to generate overlay visualization data. The one or more processors may provide, to the portable projection mapping device, the overlay visualization data, wherein the overlay visualization data may cause the portable projection mapping device to project a visualization on a target object. The one or more processors may utilize the recognition parameters for recognizing the digitizing probe to enable a user to interact with the visualization.

In some implementations, a non-transitory computer-readable medium may store a set of instructions that includes one or more instructions that, when executed by one or more processors of a device, cause the device to provide, to a camera and a projector of a portable projection mapping device, first instructions for calibrating the camera and the projector, and receive, from the camera and the projector and based on the first instructions, calibration parameters for the camera and the projector. The one or more instructions may cause the device to calculate a stereo calibration between the camera and the projector based on the calibration parameters for the camera and the projector, and provide, to the camera, second instructions for recognizing a reference instrument and a digitizing probe associated with the portable projection mapping device. The one or more instructions may cause the device to receive, from the camera and based on the second instructions, binocular images, and determine a marker extraction, a marker matching, a three-dimensional coordinate reconstruction of markers, a model fitting, and a three-dimensional registration, based on the binocular images. The one or more instructions may cause the device to determine recognition parameters for recognizing the reference instrument and the digitizing probe, based on the binocular images, the marker extraction, the marker matching, the three-dimensional coordinate reconstruction of markers, the model fitting, and the three-dimensional registration. The one or more instructions may cause the device to process the recognition parameters for recognizing the reference instrument and the stereo calibration between the camera and the projector, with an optical tracking model, to generate overlay visualization data, and cause the portable projection mapping device to project a visualization on a target object based on the overlay visualization data.

DETAILED DESCRIPTION OF PREFERRED EMBODIMENTS

Figure 1A:
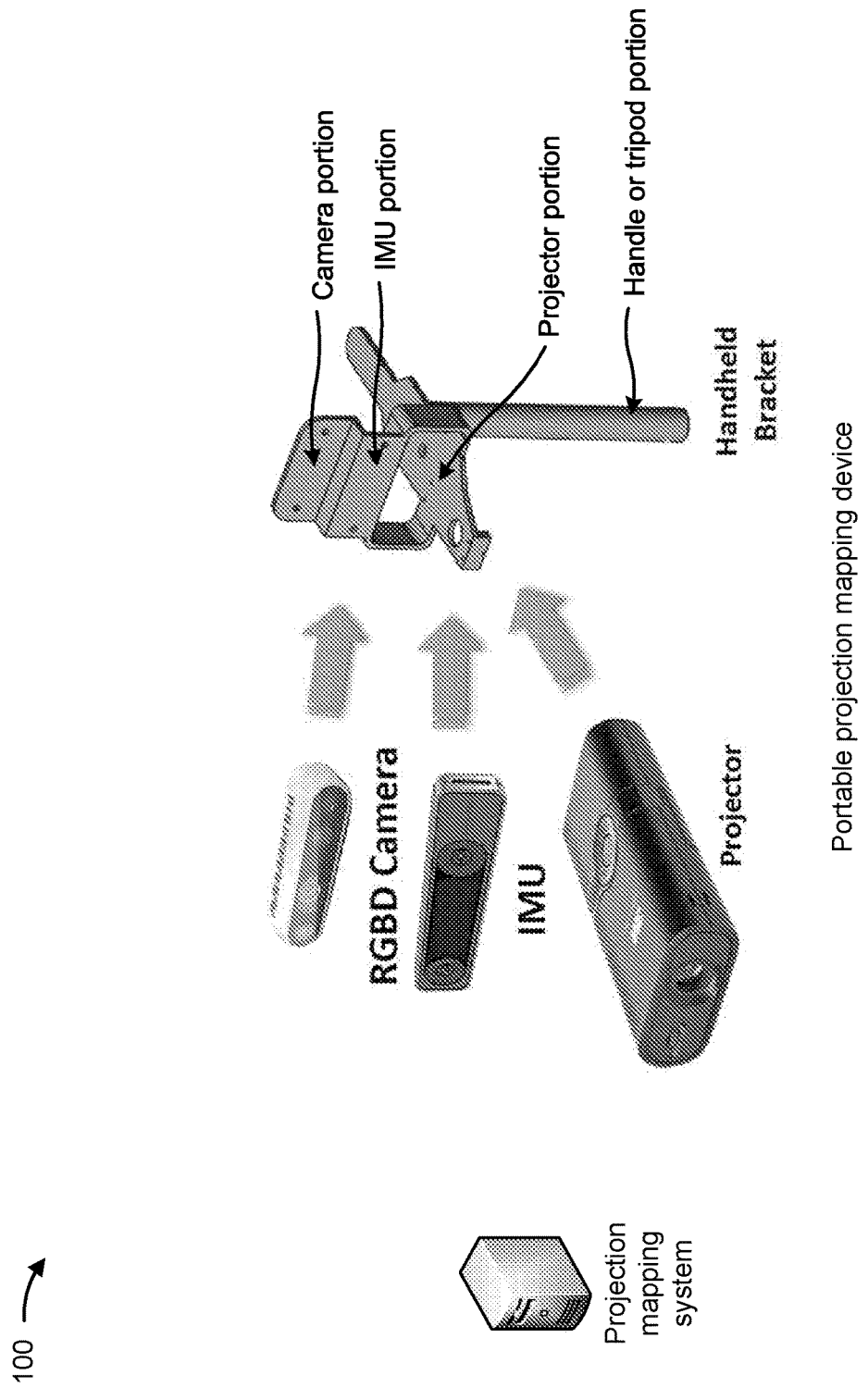
FIGS. 1A-1G are diagrams of one or more example implementations described herein.

The following detailed description of example implementations refers to the accompanying drawings. The same reference numbers in different drawings may identify the same or similar elements.

Projection mapping typically includes projecting texture patterns or multimedia onto static screens or objects, where a camera, a projector, and an object on which to project are all relatively fixed. Dynamic projection mapping is defined as projection-based augmented reality (AR) for a moving object without misalignment. Conventional projection mapping arrangements include a fixed projector and a fixed screen, and may require a head mounted display. Such conventional arrangements may be unable to provide dynamic projection mapping for moving objects due to misalignment. Thus, conventional projection mapping arrangements waste computing resources (e.g., processing resources, memory resources, communication resources, and/or the like), networking resources, human resources, and/or the like associated with providing misaligned images and/or video on a moving object, attempting to correct the misaligned images and/or video, incorrectly performing actions (e.g., surgical procedures) based on the misaligned images and/or video, and/or the like.

Some implementations described herein include a portable projection mapping device and a projection mapping system for providing spatial and temporal mapping of images and/or videos. For example, the projection mapping system may provide, to a camera and a projector of the portable projection mapping device, first instructions for calibrating the camera and the projector, and may receive, from the camera and the projector and based on the first instructions, calibration parameters for the camera and the projector. The projection mapping system may calculate a stereo calibration between the camera and the projector based on the calibration parameters for the camera and the projector, and may provide, to the camera, second instructions for recognizing a reference instrument and a digitizing probe associated with the portable projection mapping device. The projection mapping system may receive, from the camera and based on the second instructions, binocular images, and may determine a marker extraction, a marker matching, a three-dimensional coordinate reconstruction of markers, a model fitting, and a three-dimensional registration, based on the binocular images. The projection mapping system may determine recognition parameters for recognizing the reference instrument and the digitizing probe, based on the binocular images, the marker extraction, the marker matching, the three-dimensional coordinate reconstruction of markers, the model fitting, and the three-dimensional registration. The projection mapping system may process the recognition parameters for recognizing the reference instrument and the stereo calibration between the camera and the projector, with an optical tracking model, to generate overlay visualization data, and may provide, to the portable projection mapping device, the overlay visualization data.

In this way, the portable projection mapping device and the projection mapping system provide spatial and temporal mapping of images and/or videos. The projection mapping system may enable the portable projection mapping device to project images and/or videos on a target object anywhere in three-dimensional space and without a head mounted display. The projection mapping system may enable the portable projection mapping device to overlay projected images and/or videos on an actual object, which enables multiple users to simultaneously view the projected images and/or videos. For example, patient data images may be viewed by holding the portable projection mapping device and augmenting a view at any point with any angle. Thus, the projection mapping system conserves computing resources, networking resources, human resources, and/or the like that would otherwise have been wasted in providing misaligned images and/or video on a moving object, attempting to correct the misaligned images and/or video, incorrectly performing actions based on the misaligned images and/or video, and/or the like.

FIGS. 1A-1G are diagrams of one or more example implementations 100 associated with utilizing a portable projection mapping device and a projection mapping system for providing spatial and temporal mapping of images and/or videos. As shown in FIG. 1A, example implementations 100 include a projection mapping system and a portable projection mapping device. The portable projection mapping device may include a device that projects texture patterns or multimedia on static screens or objects, and that provides projection-based AR for a moving object without misalignment. The projection mapping system may include a system that provides, via the portable projection mapping device, spatial and temporal mapping of images and/or videos.

As further shown in FIG. 1A, the portable projection mapping device may include a camera, an inertial measurement unit (IMU), and a projector provided in portions of a handheld bracket. The camera may include a video camera, a depth camera, a red-green-blue depth (RGBD) camera, and/or the like that captures images of a target object. The IMU may include an electronic device that measures and reports a target object's specific force, angular rate, orientation, and/or the like using a combination of accelerometers, gyroscopes, magnetometers, and/or the like. The projector may include an optical device that projects an image and/or moving images (e.g., video) onto a surface, such as a target object.

In some implementations, that camera includes an RGB camera with a resolution of 1920×1080 and a frame rate of thirty frames per second (fps), and an active stereo infrared (IR) camera with a resolution of 1280×720 and a frame rate of ninety fps. The portable projection mapping device may utilize the stereo vision of the stereo IR camera as an optical tracking unit, due to a high frame rate and a robustness to interference of ambient light of the camera. A pair of 850 nanometer (nm) narrow bandpass filters may be installed on the RGB camera to convert the RGB camera into a stereo IR camera, and an IR emitter may be provided between the two IR cameras and may emit 850 nm infrared light.

The handheld bracket may include a mechanism that is sized and shaped to receive and retain the camera, the IMU, and the projector. For example, the handheld bracket may include a handle or tripod portion that may be held by a user of the portable projection mapping device or utilized as a tripod to support the camera, the IMU, and the projector. The handheld bracket may include a projector portion that is sized and shaped to receive and retain the projector, an IMU portion that is sized and shaped to receive and retain the IMU, and a camera portion that is sized and shaped to receive and retain the camera. In some implementations, the portions of the handheld bracket are integrally formed from a common material (e.g., a metal, a plastic, and/or the like), are separately formed, and/or the like.

Figure 1B:
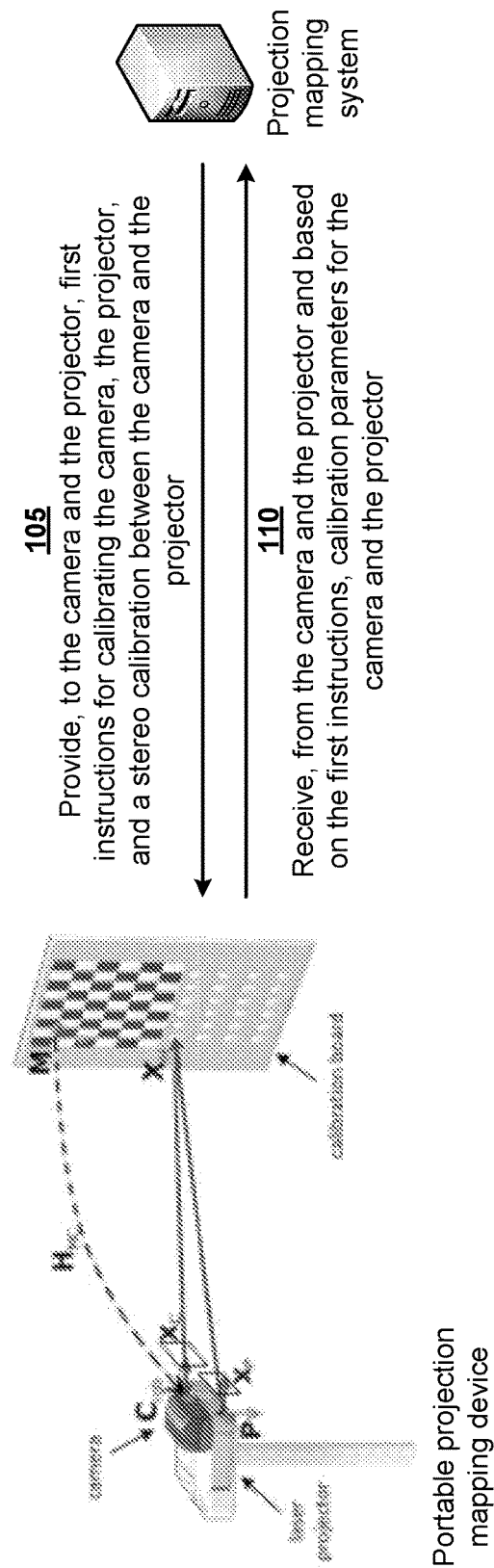

As shown in FIG. 1B, and by reference number 105, the projection mapping system may provide, to the camera and the projector of the portable projection mapping device, first instructions for calibrating the camera, the projector, and a stereo calibration between the camera and the projector. Prior to using the portable projection mapping device, a calibration of the camera and the projector may be executed by the projection mapping system to calculate intrinsic parameters of the camera and the projector and extrinsic parameters that represent a transformation between the camera and the projector. In addition, to recognize and to track surgical instruments, the projection mapping system may configure the surgical instruments based on a set of retro-reflective markers.

Calibration of the camera and the project may be required when a location of the camera relative to a location of the projector has been changed or is unknown. The calibration may be required only once as long as the positioning of the camera and/or the projector is not changed after the calibration. However, the calibration may be updated very quickly and easily with the projection mapping system. The projection mapping system may employ a pin-hole model for both the camera and the projector calibration, and may apply a model (e.g., Zhang's model) to perform the calibration, where the projector is treated as an inverse of the camera.

As further shown in FIG. 1B, and by reference number 110, the projection mapping system may receive, from the camera and the projector and based on the first instructions, calibration parameters for the camera and the projector. For example, the projection mapping system may define coordinate systems, such as {M} which represents a model space of the pin-hole model, $\{C_{rgb}\}$ which represents an RGB camera frame, and {P} which represents a projector frame. The projection mapping system may calibrate the camera to obtain intrinsic parameters of the camera, as well as extrinsic parameters describing a transformation $H_{MCrgb}$ between the camera and the pin-hole model, in homogeneous form. The projector may project a grid pattern, where grid coordinates in the projector space may be defined as $X_P$, onto a plane of the pin-hole model. With the grid coordinates of the projected grid pattern in the camera frame $X_{Crgb}$, the coordinates of the projected grid pattern in a model space $X_M$ may be computed, by the projection mapping system, by ray casting from an origin in the camera space and using the intrinsic parameters of the camera and $H_{MCrgb}$. With $X_P$ and $X_M$, the projector may be calibrated to determine intrinsic parameters of the projector by the projection mapping system (e.g., via a model, such as a perspective-n-point (PnP) on a planar object model).

During the camera-projector calibration, the projection mapping system may utilize visualization toolkits and may provide an application for performing the camera-projector calibration. Once a user launches the application, two windows may be displayed to the user. One window may provide an array of circular dots that is displayed by the projector. The projector may be set up as an external display for the project mapping system. Once the user drags the window containing the array of circular dots to the projector display, the application may enter a full screen mode. A second window may provide a camera view of the RGB camera along with the calibration parameters, such as a quantity of circular dots, sizes of the circular dots, and/or the like. The user may select a calibrate button, and the application may capture images at a particular time interval. A quantity of images collected for the calibration process may depend on a clarity and a size of a pattern shown in the images. In some implementations, a minimum often to twenty images provides an acceptable calibration result.

Figure 1C:
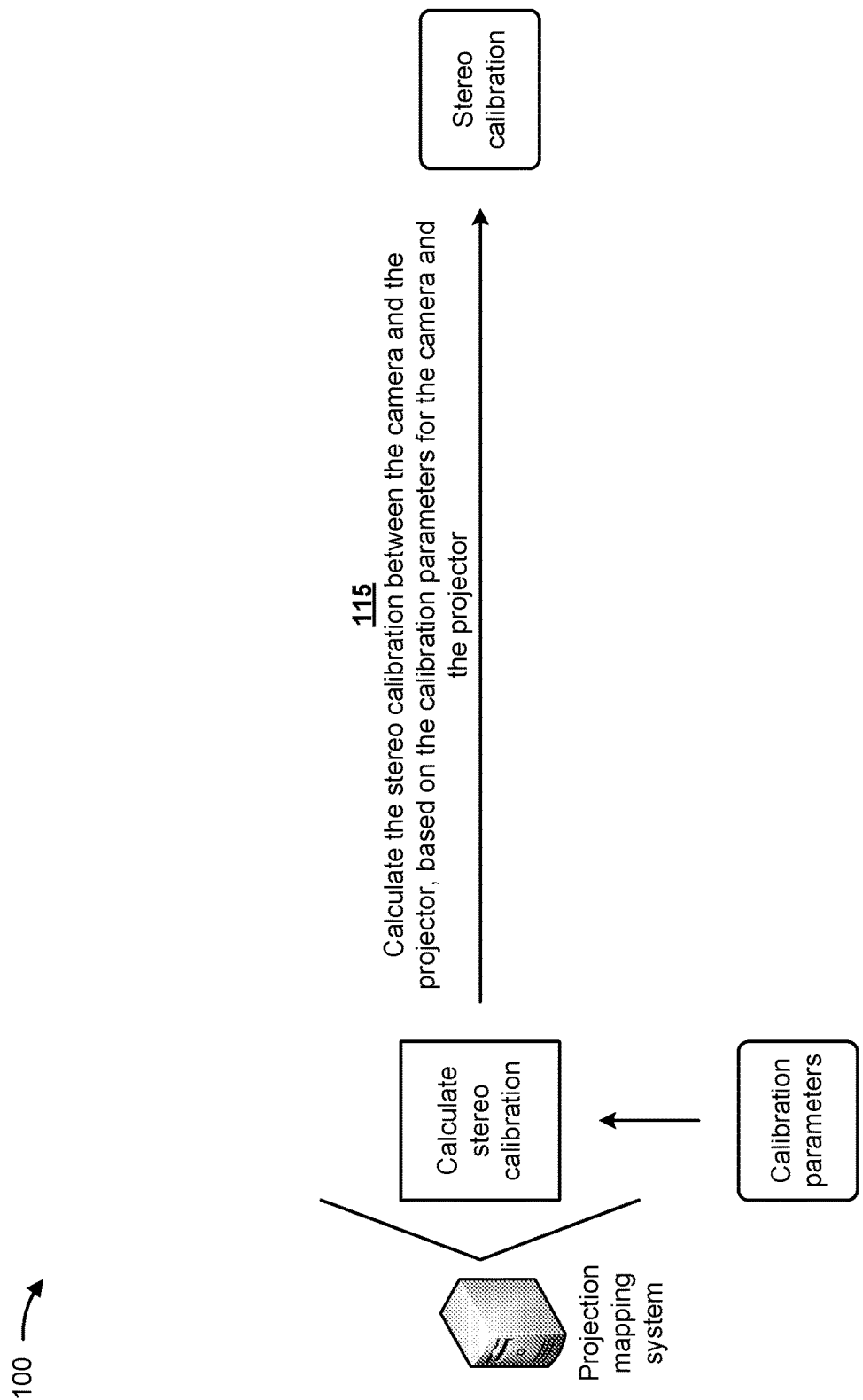

As shown in FIG. 1C, and by reference number 115, the projection mapping system may calculate the stereo calibration between the camera and the projector, based on the calibration parameters for the camera and the projector. For example, the projection mapping system may utilize a computer vision model (e.g., OpenCV) to calculate the stereo calibration between the camera and the projector, based on the calibration parameters for the camera and the projector. The stereo calibration between the camera and the projector may be performed using grid coordinates in the camera space ($X_{Crgb}$), in the projector space ($X_P$), and in the model space ($X_M$) to determine a transformation from the camera to the projector.

The projection mapping system may utilize the computer vision model to calculate the transformation from the camera to the projector. The camera may include manufacturing dimensions and a distance between the IR cameras and the RGB camera. With the transformation from the RGB camera to the projector acquired from the calibration parameters and the known transformations from the IR cameras to the RGB camera, the transformation from the IR cameras to the projector may be calculated. From the IR cameras, a pose of the retro-respective markers $H_{CR}$ may be provided. Therefore, a transformation of a reference frame to the projector may be calculated. From a registration result for the transformation from the model frame of an object {M} to a reference frame {R}, the projection mapping system may determine a relative pose of the projector with respect to the model frame {M}.

Figure 1D:
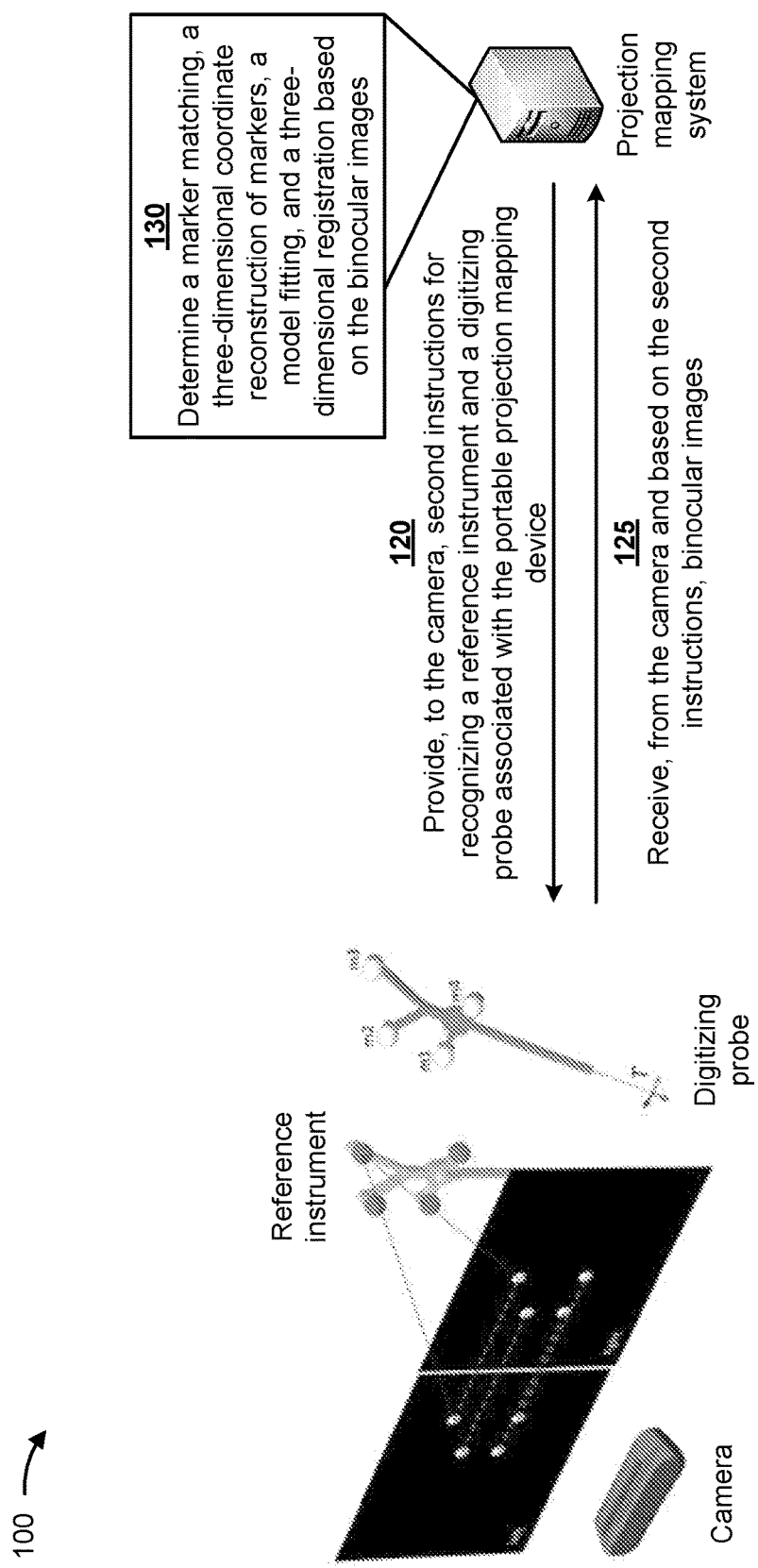

As shown in FIG. 1D, and by reference number 120, the projection mapping system may provide, to the camera of the portable projection mapping device, second instructions for recognizing a reference instrument (e.g., a surgical instrument) and a digitizing probe associated with the portable projection mapping device. A surgical instrument may include a configuration of a set of retro-reflective sphere markers with positions defined in a model coordinate system. For example, two instruments, a reference instrument and a digitizing probe, may be defined with retro-reflective markers based on instrument design recommendations. For the digitizing probe, the projection mapping system may utilize a pivot calibration tool to determine coordinates of the retro-reflective sphere markers in the coordinate system attached to a tip T of the digitizing probe. The digitizing probe may include a six-degree-of-freedom interaction device with four retro-reflective sphere markers (e.g., m1, m2, m3, m4).

When tracking systems are used based on stereo vision, surgical instruments may be treated as rigid bodies. A rigid body may include a fixed geometrical arrangement of at least three markers as feature points for tracking. After the portable projection mapping device is calibrated and a real time tracking procedure is launched, an optical tracking node may be invoked by the projection mapping system, and several parameters may be initialized by the projection mapping system, such as intrinsic parameters of the camera, instrument configurations, and/or the like. The projection mapping system may perform the following actions to recognize the reference instrument and the digitizing probe and obtain six-degree-of-freedom poses: capturing binocular images, marker extraction, marker matching, 3D coordinate reconstruction of markers, model fitting, 3D registration, and/or the like.

As further shown in FIG. 1D, and by reference number 125, the projection mapping system may receive, from the camera and based on the second instructions, binocular images. For example, the camera may capture binocular images of the retro-reflective markers associated with the reference instrument and the digitizing probe, and may provide the binocular images of the retro-reflective markers to the projection mapping system. The projection mapping system may receive the binocular images of the retro-reflective markers. Since an IR emitter and a filter is provided with the portable projection mapping device, only the retro-reflective markers may be highlighted in the binocular images while remaining portions of the binocular images may be darkened. When new binocular images arrive, an optical tracking callback function of the projection mapping system may be triggered to track the retro-reflective markers.

As further shown in FIG. 1D, and by reference number 130, the projection mapping system may determine a marker matching, a 3D coordinate reconstruction of markers, a model fitting, and a 3D registration based on the binocular images. The projection mapping system may process the binocular images, with a blob detection model, to determine 2D image coordinates of a centroid of a highlighted area. The projection mapping system may accurately extract pixel coordinates of a marker's center, which may be used to calculate 3D coordinates of the marker positions in a camera frame. The blob detection model may enable tuning of several parameters, such as a threshold, an area, a circularity, a convexity, and/or the like of blobs, to optimize the performance of marker extraction for different scenarios.

The projection mapping system may determine a correspondence of markers detected at a same location in left views and right views of binocular images before 3D coordinate reconstruction. For a marker m in a left view, the projection mapping system may determine a corresponding marker m' in a right view. The projection mapping system may determine the corresponding marker by searching along an epi-polar line of the marker m in the right view, where corresponding marker m' is located. Since there may be a translational shift along a horizontal axis between the left and right IR cameras, the epi-polar line of the marker m is a horizontal line of a same pixel coordinate in the right view, and vice versa. The projection mapping system may sort the detected markers in the left views and the right views of the binocular images according to vertical and horizontal positions of the detected markers. Hence, the projection mapping system may determine the correspondence of the markers by matching sorted orders of the markers.

Once the detected markers are matched pairwise in the left and right views of the binocular images, the projection mapping system may reconstruct the 3D coordinates of the detected markers via triangulation. The 3D coordinates of the detected markers may be derived from 2D coordinates of the detected markers in the left views and the right views and based on the intrinsic parameters of the stereo IR cameras and the extrinsic parameters representing the transformation between the stereo IR cameras.

Given a set of 3D reconstructed markers, the projection mapping system may match a subset of the 3D reconstructed markers to the detected markers. Assuming N reconstructed markers and K markers in the reference instrument, the projection mapping system may utilize a brute force method to compute a best-fitting distance matrix to a pre-defined pattern distance matrix from a subset of $$\frac{N!}{(N-K)!}$$

permutations of K×K matrices, is where a distance matrix is a K×K symmetric matrix constructed by measuring a 3D distance between each marker pair of a pattern. For multiple reference instruments, a time complexity may be O(N!), assuming a computation of difference between two K×K distance matrices can be performed in a constant time. The projection mapping system may determine a best-fitting distance matrix with a computational time complexity that is reduced to $O(N^3)$ by grouping markers that are on the same surgical instrument and then adding a convex hull constraint with a clockwise order for grouped markers. With N reconstructed markers, the projection mapping system may determine the two furthest markers from $$\binom{N}{2}$$

combinations of pairing distances. The projection mapping system may group two sets of markers centered at the two furthest markers. Knowing the quantity of markers on a surgical instrument (K), the projection mapping system may group two sets of markers by including the closest K−1 markers in which a distance of the closest markers to the center is within a maximum marker pair distance among multiple surgical instrument configurations. For every group of markers, assuming K markers in a group, the projection mapping system may apply a convex hull constraint to reduce a quantity of combinations of distance matrices from O(K!) to O(K). In addition, the projection mapping system may assign a particular order (e.g., clockwise) to further reduce the combinations from the convex hull constraint by one half.

After the 3D reconstructed markers are matched to the markers defined in a surgical instrument configuration, the marker locations may be provided in the camera space $P_C$ and the model space $P_M$. The projection mapping system may apply a closed-form solution to compute the transformation $H_{CM}$ from the camera to the reference instrument, which is also a pose of the reference instrument in the camera coordinate system.

Figure 1E:
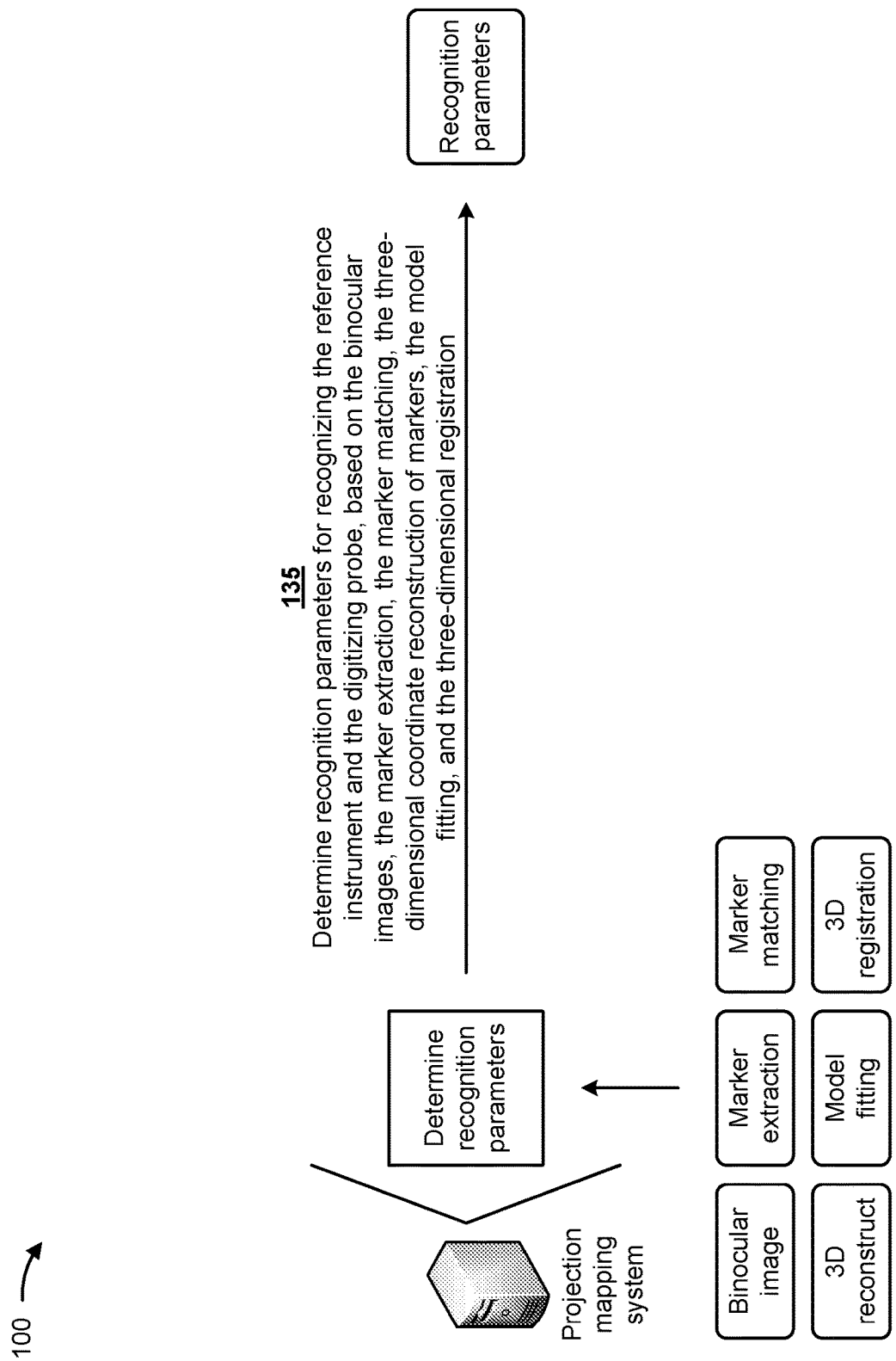

As shown in FIG. 1E, and by reference number 135, the projection mapping system may determine recognition parameters for recognizing the reference instrument and the digitizing probe, based on the binocular images, the marker extraction, the marker matching, the three-dimensional coordinate reconstruction of markers, the model fitting, and the three-dimensional registration. For example, in order to reconstruct a 3D model of a skull, the projection mapping system may obtain computed tomography (CT) images. Through registration, the projection mapping system may calculate the transformation $H_{MR}$ between the model space {M} and the reference space {R}, in homogeneous form so that every coordinate system is later transformed into the reference space {R}. The model space {M} may be derived after 3D reconstruction using the CT images. The reference space {R} may be defined for the reference instrument that is fixed on a plastic head. The projection mapping system may calculate the transformation $H_{MR}$ by selecting anatomical landmarks. During the selection procedure, the digitizing probe may be used to pick the anatomical landmarks, and locations of the anatomical landmarks may be calculated by using the transformation from the stereo IR camera to the reference instrument $H_{CR}$ and the transformation from the stereo IR camera to the digitizing probe $H_{CT}$. The anatomical landmarks selected by the digitizing probe may be represented in the camera space as $P_C$, which can be transformed into the reference space with $P_R = H_{CR}^{-1} P_C$. With the anatomical landmarks represented in the reference space $P_R$ and the model space $P_M$, the projection mapping system may calculate the 3D rigid transformation between two sets of point-correspondences, as follows:

$$\hat{H}_{MR} = \underset{H_{MR}}{\arg\min} \sum_{i=1}^{n} (P_M - H_{MR} P_R)^2.$$

The projection mapping system may calculate a singular-value decomposition of a derived matrix to solve the above expression. Once $\hat{H}_{MR}$ is estimated, the projection mapping system may transform the model space $P_M$ into the reference space as $\hat{P}_R$, where $\hat{P}_R = \hat{H}_{MR}^{-1} P_M$. The projection mapping system may derive a registration error by calculating an average landmark pairs distance for $P_R$ and $\hat{P}_R$.

Figure 1F:
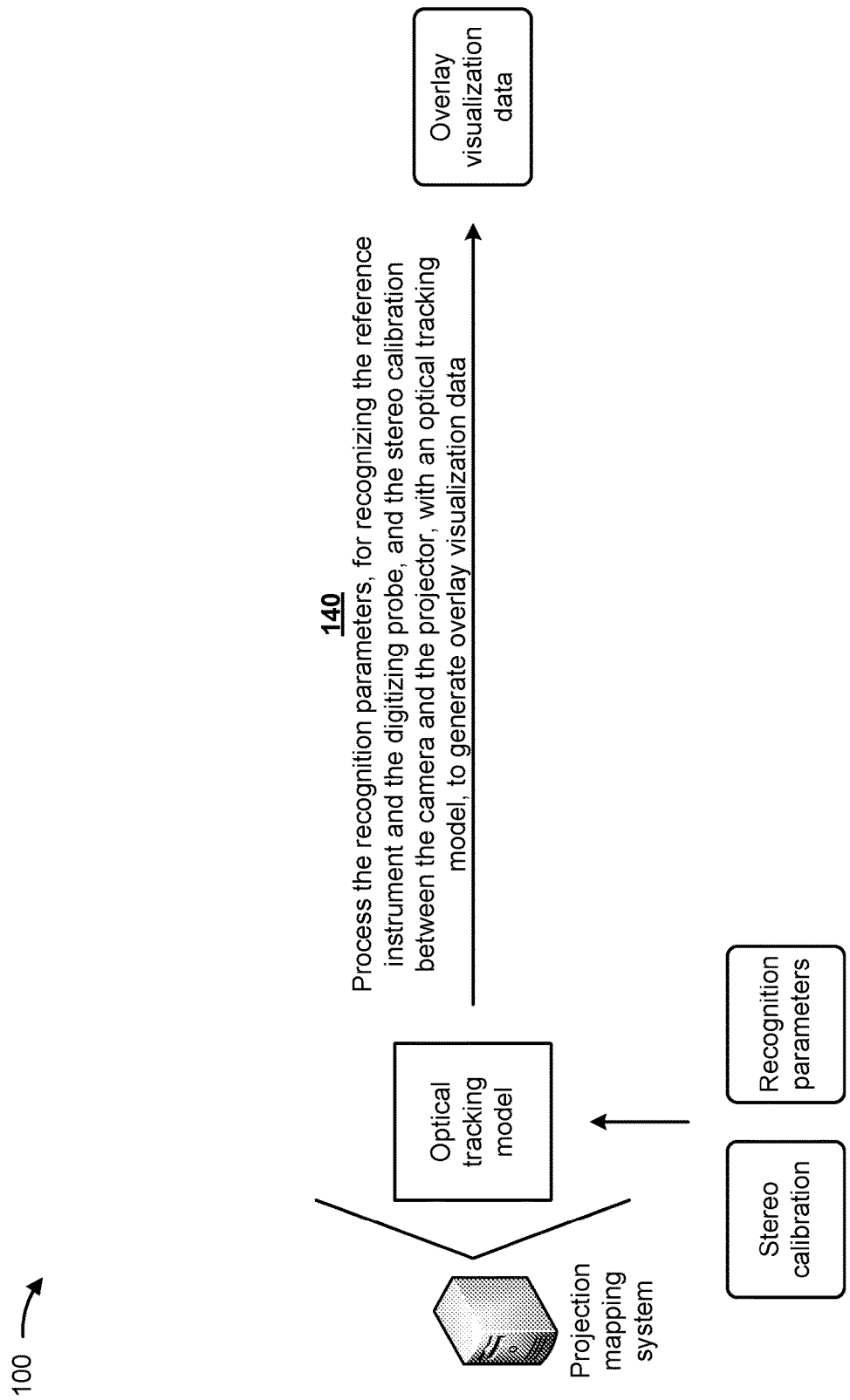

As shown in FIG. 1F, and by reference number 140, the projection mapping system may process the recognition parameters, for recognizing the reference instrument and the digitizing probe, and the stereo calibration between the camera and the projector, with an optical tracking model, to generate overlay visualization data. The projection mapping system may create a virtual scene to precisely match the real scene based on the camera intrinsic parameters and the pose of camera defined in the virtual scene. In projection mapping, the projector is treated as a viewing camera in the virtual scene. Thus, the projection mapping system may set up the camera based on the intrinsic parameters of the projector. In addition, the transformation $H_{OC}$ from the 3D model of the object to the camera in the virtual scene may be identical to the transformation $H_{MP}$ from the object to the projector in the real world. Since the coordinate system of the virtual scene has been set to align with the coordinate system of the model M, the projection mapping system may update the transformation $H_{OC}$ from the transformation $H_{MP}$ during the projection mapping process, where $H_{OC} = H_{MP}$. Since the transformation $H_{PCrgb}$ from the projector to the RGB camera, the transformation $H_{CrgbC}$ from the RGB camera to the IR cameras, the transformation $H_{CR}$ from the IR cameras to the reference instrument, and the transformation $H_{RM}$ from the reference instrument to the model are calculated, the projection mapping system may calculate a desired transformation $H_{MP}$ (e.g., overlay visualization data) as follows:

$$H_{MP} = H_{RM}^{-1} H_{CR}^{-1} H_{CrgbC}^{-1} H_{PCrgb}^{-1}.$$

Figure 1G:
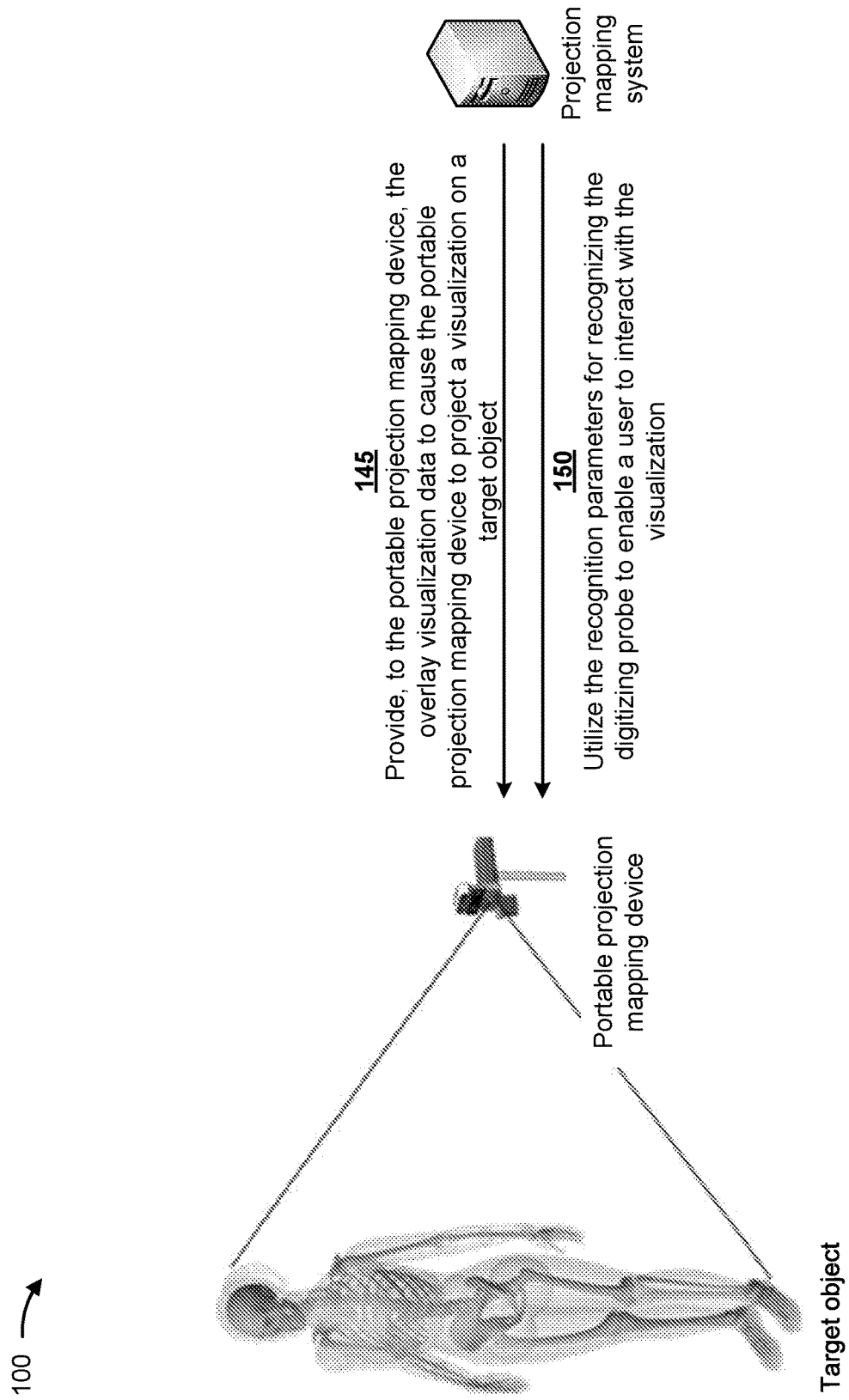

As shown in FIG. 1G, and by reference number 145, the projection mapping system may provide, to the portable projection mapping device, the overlay visualization data to cause the portable projection mapping device to project a visualization on a target object. In some implementations, the portable projection mapping device may utilize the overlay visualization data to project an image and/or a video on the target object. For example, an image rendered from the camera view in the virtual scene may be projected by the portable projection mapping device. In single-stage cranioplasty, a patient's head is mostly static during the operation. Therefore, a skull model frame M may be used as a global fixed frame during the visualization. As a user moves the portable projection mapping device, the transformations and the visualization may be updated in real time with every single image frame. Thus, there is minimal projection lag in the visualization, and the portable projection mapping device provides a user with a comfortable viewing experience.

As further shown in FIG. 1G, and by reference number 150, the projection mapping system may utilize the recognition parameters for recognizing the digitizing probe to enable a user to interact with the visualization. For example, since the digitizing probe is recognized by the projection mapping system, as described above, the user may utilize the digitizing probe to interact with the visualization. As a user moves the digitizing device, the transformations and the visualization may be updated in real time with every single image frame.

In this way, the portable projection mapping device and the projection mapping system provide spatial and temporal mapping of images and/or videos. For example, the projection mapping system may enable the portable projection mapping device to project images and/or videos on a target object anywhere in three-dimensional space and without a head mounted display. Thus, the projection mapping system conserves computing resources, networking resources, human resources, and/or the like that would otherwise have been wasted in providing misaligned images and/or video on a moving object, attempting to correct the misaligned images and/or video, incorrectly performing actions based on the misaligned images and/or video, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
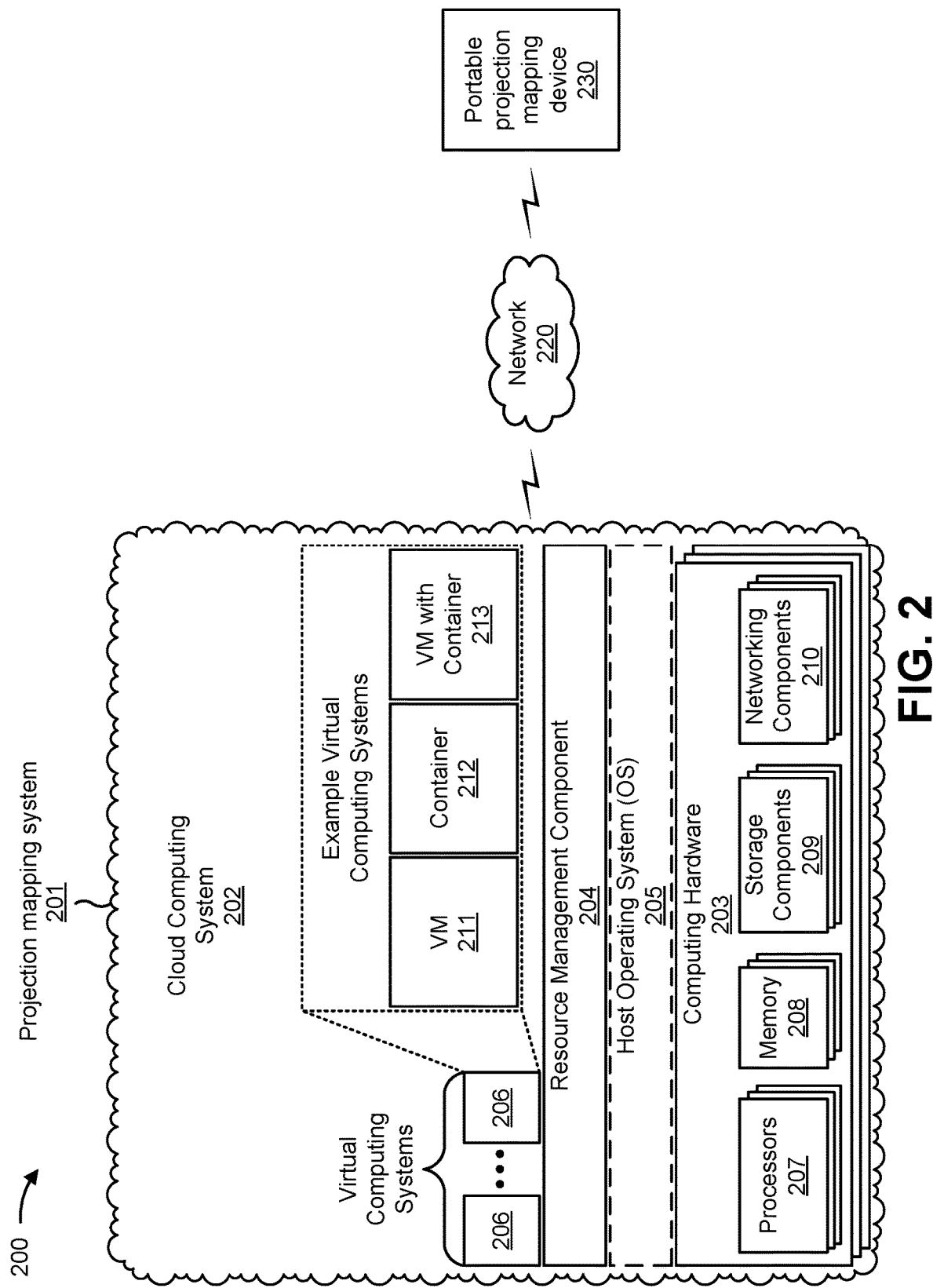
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a projection mapping system 201, which may include one or more elements of and/or may execute within a cloud computing system 202. The cloud computing system 202 may include one or more elements 203-213, as described in more detail below. As further shown in FIG. 2, environment 200 may include a network 220 and/or a portable projection mapping device 230. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although projection mapping system 201 may include one or more elements 203-213 of the cloud computing system 202, may execute within the cloud computing system 202, and/or may be hosted within the cloud computing system 202, in some implementations, projection mapping system 201 may not be cloud-based (e.g., may be implemented outside of a cloud computing system) or may be partially cloud-based. For example, projection mapping system 201 may include one or more devices that are not part of the cloud computing system 202, such as device 300 of FIG. 3, which may include a standalone server or another type of computing device. Projection mapping system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

Portable projection mapping device 230 includes one or more devices capable of receiving, generating, storing, processing, and/or providing information, such as information described herein. For example, portable projection mapping device 230 may include a camera, an IMU, and a projector provided in portions of a handheld bracket. The camera may include a video camera, a depth camera, an RGBD camera, a stereo IR camera, and/or the like that captures images of a target object. The IMU may include an electronic device that measures and reports a target object's specific force, angular rate, orientation, and/or the like using a combination of accelerometers, gyroscopes, magnetometers, and/or the like. The projector may include an optical device that projects an image and/or moving images (e.g., video) onto a surface, such as a target object. The handheld bracket may include a mechanism that is sized and shaped to receive and retain the camera, the IMU, and the projector.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
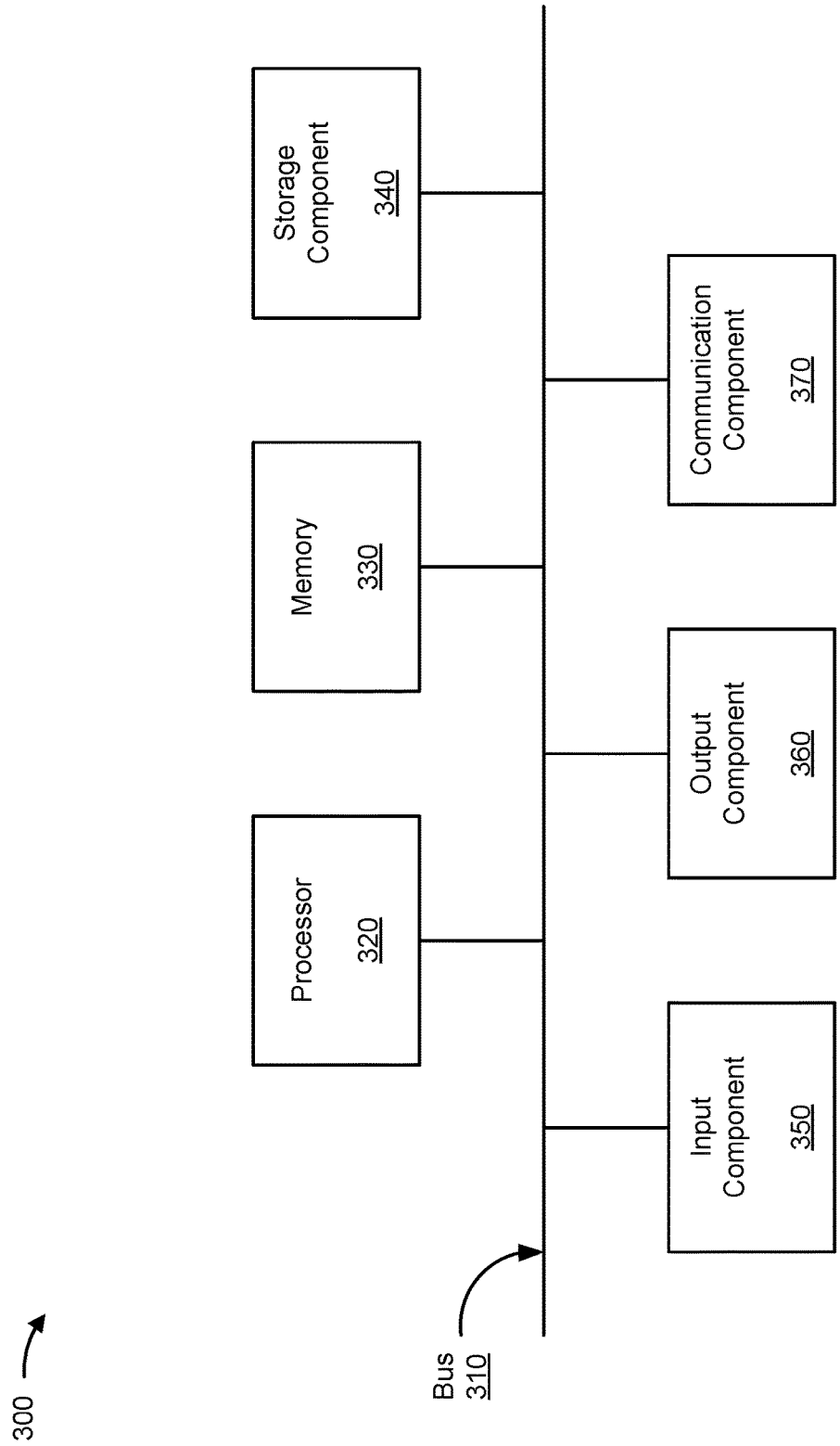
FIG. 3 is a diagram of example components of one or more devices of FIG. 2.

FIG. 3 is a diagram of example components of a device 300, which may correspond to projection mapping system 201, computing hardware 203, and/or portable projection mapping device 230. In some implementations, projection mapping system 201, computing hardware 203, and/or portable projection mapping device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory), a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
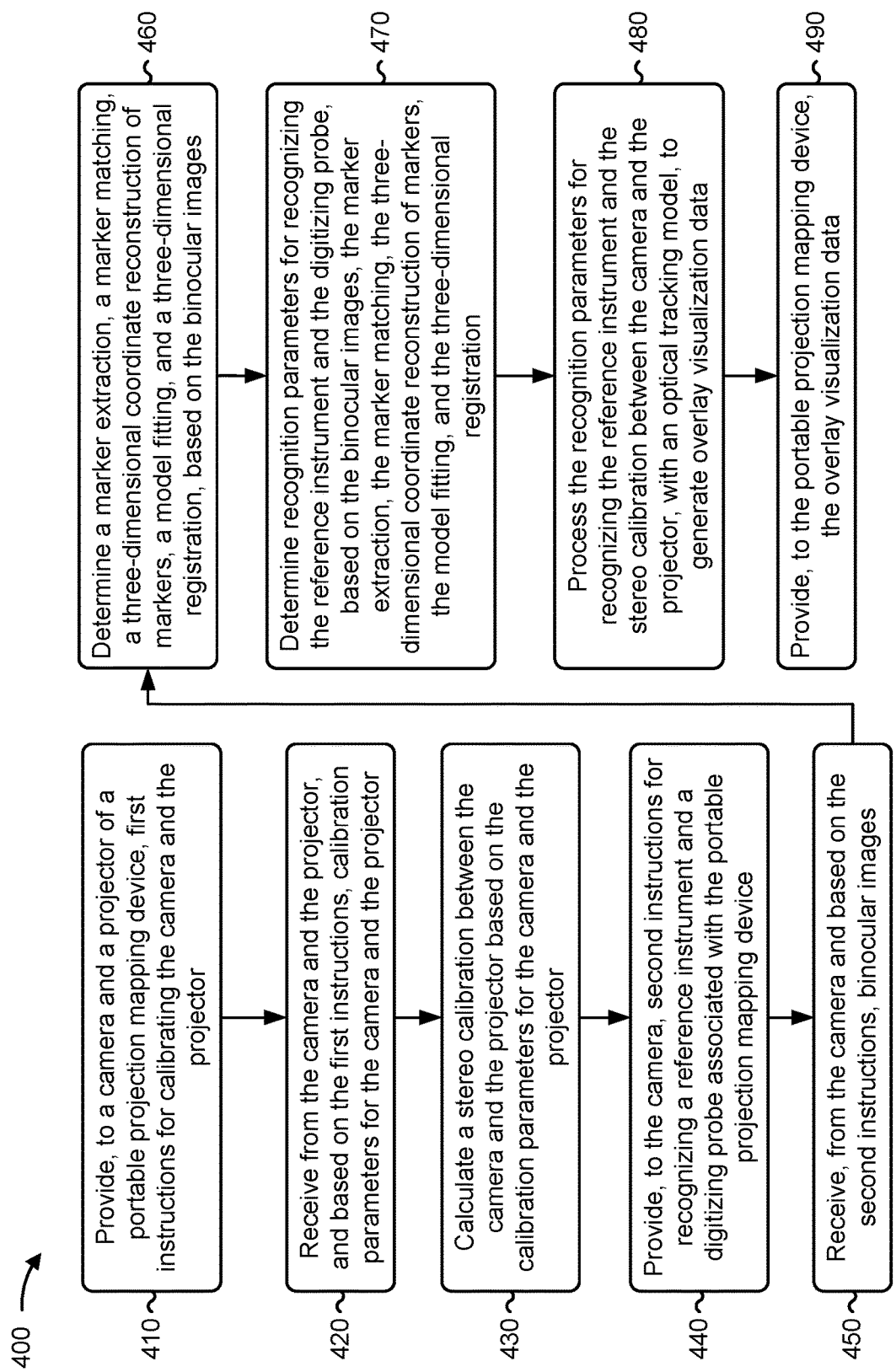
FIG. 4 is a flow chart of an example process for utilizing a portable projection mapping device and a projection mapping system for providing spatial and temporal mapping of images and/or videos.

FIG. 4 is a flowchart of an example process 400 associated with utilizing a portable projection mapping device and a projection mapping system for providing spatial and temporal mapping of images and/or videos. In some implementations, one or more process blocks of FIG. 4 may be performed by a device (e.g., projection mapping system 201). In some implementations, one or more process blocks of FIG. 4 may be performed by another device or a group of devices separate from or including the device, such as a portable projection mapping device (e.g., portable projection mapping device 230). Additionally, or alternatively, one or more process blocks of FIG. 4 may be performed by one or more components of device 300, such as processor 320, memory 330, storage component 340, input component 350, output component 360, communication component 370, and/or the like.

As shown in FIG. 4, process 400 may include providing, to a camera and a projector of a portable projection mapping device, first instructions for calibrating the camera and the projector (block 410). For example, the device may provide, to a camera and a projector of a portable projection mapping device, first instructions for calibrating the camera and the projector, as described above.

As further shown in FIG. 4, process 400 may include receiving, from the camera and the projector, and based on the first instructions, calibration parameters for the camera and the projector (block 420). For example, the device may receive, from the camera and the projector, and based on the first instructions, calibration parameters for the camera and the projector, as described above.

As further shown in FIG. 4, process 400 may include calculating a stereo calibration between the camera and the projector based on the calibration parameters for the camera and the projector (block 430). For example, the device may calculate a stereo calibration between the camera and the projector based on the calibration parameters for the camera and the projector, as described above.

As further shown in FIG. 4, process 400 may include providing, to the camera, second instructions for recognizing a reference instrument and a digitizing probe associated with the portable projection mapping device (block 440). For example, the device may provide, to the camera, second instructions for recognizing a reference instrument and a digitizing probe associated with the portable projection mapping device, as described above.

As further shown in FIG. 4, process 400 may include receiving, from the camera and based on the second instructions, binocular images (block 450). For example, the device may receive, from the camera and based on the second instructions, binocular images, as described above.

As further shown in FIG. 4, process 400 may include determining a marker extraction, a marker matching, a three-dimensional coordinate reconstruction of markers, a model fitting, and a three-dimensional registration, based on the binocular images (block 460). For example, the device may determine a marker extraction, a marker matching, a three-dimensional coordinate reconstruction of markers, a model fitting, and a three-dimensional registration, based on the binocular images, as described above.

As further shown in FIG. 4, process 400 may include determining recognition parameters for recognizing the reference instrument and the digitizing probe, based on the binocular images, the marker extraction, the marker matching, the three-dimensional coordinate reconstruction of markers, the model fitting, and the three-dimensional registration (block 470). For example, the device may determine recognition parameters for recognizing the reference instrument and the digitizing probe, based on the binocular images, the marker extraction, the marker matching, the three-dimensional coordinate reconstruction of markers, the model fitting, and the three-dimensional registration, as described above.

As further shown in FIG. 4, process 400 may include processing the recognition parameters for recognizing the reference instrument and the stereo calibration between the camera and the projector, with an optical tracking model, to generate overlay visualization data (block 480). For example, the device may process the recognition parameters for recognizing the reference instrument and the stereo calibration between the camera and the projector, with an optical tracking model, to generate overlay visualization data, as described above.

As further shown in FIG. 4, process 400 may include providing, to the portable projection mapping device, the overlay visualization data (block 490). For example, the device may provide, to the portable projection mapping device, the overlay visualization data, as described above.

In a first implementation, the overlay visualization data causes the portable projection mapping device to project a visualization on a target object.

In a second implementation, process 400 includes utilizing the recognition parameters for recognizing the digitizing probe to enable a user to interact with the visualization.

In a third implementation, the visualization includes one of an image or a video.

In a fourth implementation, the first instructions cause the camera to generate intrinsic camera calibration parameters and extrinsic camera calibration parameters and cause the projector to generate intrinsic projector calibration parameters, wherein the calibration parameters for the camera and the projector include the intrinsic camera calibration parameters, the extrinsic camera calibration parameters, and the intrinsic projector calibration parameters.

In a fifth implementation, calculating the stereo calibration between the camera and the projector based on the calibration parameters for the camera and the projector includes processing the calibration parameters for the camera and the projector, with a computer vision model, to calculate the stereo calibration between the camera and the projector.

In a sixth implementation, process 400 includes processing the binocular images, with an optical tracking callback model, to track markers of the digitizing probe.

In a seventh implementation, processing the marker extraction includes processing the marker extraction, with a computer vision model, to optimize performance of the marker extraction for different scenarios.

In an eighth implementation, determining the marker matching includes sorting detected markers in the binocular images according to vertical positions of the detected markers and horizontal positions of the detected markers, and matching the detected markers, to generate the marker matching, based on sorting the detected markers.

In a ninth implementation, determining the three-dimensional coordinate reconstruction of markers includes utilizing triangulation on detected markers in the binocular images to determine the three-dimensional coordinate reconstruction of markers.

In a tenth implementation, determining the model fitting includes matching a subset of the three-dimensional coordinate reconstruction of markers to detected markers in the binocular images to determine the model fitting.

In an eleventh implementation, determining the three-dimensional registration includes calculating a singular-value decomposition of a derived matrix associated with the model fitting to determine the three-dimensional registration.

In a twelfth implementation, the overlay visualization data is associated with an augmented reality image or video.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   providing, by a device and to a camera and a projector of a portable projection mapping device, first instructions for calibrating the camera and the projector;
   receiving, by the device, from the camera and the projector, and based on the first instructions, calibration parameters for the camera and the projector;
   calculating, by the device, a stereo calibration between the camera and the projector based on the calibration parameters for the camera and the projector;
   providing, by the device and to the camera, second instructions for recognizing a reference instrument and a digitizing probe associated with the portable projection mapping device;
   receiving, by the device, from the camera, and based on the second instructions, binocular images;
   determining, by the device, a marker extraction, a marker matching, a three-dimensional coordinate reconstruction of markers, a model fitting, and a three-dimensional registration, based on the binocular images;
   determining, by the device, recognition parameters for recognizing the reference instrument and the digitizing probe, based on the binocular images, the marker extraction, the marker matching, the three-dimensional coordinate reconstruction of markers, the model fitting, and the three-dimensional registration;
   processing, by the device, the recognition parameters for recognizing the reference instrument and the stereo calibration between the camera and the projector, with an optical tracking model, to generate overlay visualization data; and
   providing, by the device and to the portable projection mapping device, the overlay visualization data.

2. The method of claim 1, wherein the overlay visualization data cause the portable projection mapping device to project a visualization on a target object.

3. The method of claim 2, further comprising:
utilizing the recognition parameters for recognizing the digitizing probe to enable a user to interact with the visualization.

4. The method of claim 2, wherein the visualization includes one of an image or a video.

5. The method of claim 1, wherein the first instructions cause the camera to generate intrinsic camera calibration parameters and extrinsic camera calibration parameters and cause the projector to generate intrinsic projector calibration parameters,
wherein the calibration parameters for the camera and the projector include the intrinsic camera calibration parameters, the extrinsic camera calibration parameters, and the intrinsic projector calibration parameters.

6. The method of claim 1, wherein calculating the stereo calibration between the camera and the projector based on the calibration parameters for the camera and the projector comprises:
processing the calibration parameters for the camera and the projector, with a computer vision model, to calculate the stereo calibration between the camera and the projector.

7. The method of claim 1, further comprising:
processing the binocular images, with an optical tracking callback model, to track markers of the digitizing probe.

8. A device, comprising:
one or more memories; and
one or more processors, communicatively coupled to the one or more memories, configured to:
provide, to a camera and a projector of a portable projection mapping device, first instructions for calibrating the camera and the projector;
receive, from the camera and the projector and based on the first instructions, calibration parameters for the camera and the projector;
calculate a stereo calibration between the camera and the projector based on the calibration parameters for the camera and the projector;
provide, to the camera, second instructions for recognizing a reference instrument and a digitizing probe associated with the portable projection mapping device;
receive, from the camera and based on the second instructions, binocular images;
determine one or more of a marker extraction, a marker matching, a three-dimensional coordinate reconstruction of markers, a model fitting, or a three-dimensional registration, based on the binocular images;
determine recognition parameters for recognizing the reference instrument and the digitizing probe, based on the binocular images, the marker extraction, the marker matching, the three-dimensional coordinate reconstruction of markers, the model fitting, and the three-dimensional registration;
process the recognition parameters for recognizing the reference instrument and the stereo calibration between the camera and the projector, with an optical tracking model, to generate overlay visualization data;
provide, to the portable projection mapping device, the overlay visualization data,
wherein the overlay visualization data cause the portable projection mapping device to project a visualization on a target object; and
utilize the recognition parameters for recognizing the digitizing probe to enable a user to interact with the visualization.

9. The device of claim 8, wherein the one or more processors, when determining the marker extraction, are configured to:
process the marker extraction, with a computer vision model, to optimize performance of the marker extraction for different scenarios.

10. The device of claim 8, wherein the one or more processors, when determining the marker matching, are configured to:
sort detected markers in the binocular images according to vertical positions of the detected markers and horizontal positions of the detected markers; and
match the detected markers, to generate the marker matching, based on sorting the detected markers.

11. The device of claim 8, wherein the one or more processors, when determining the three-dimensional coordinate reconstruction of markers, are configured to:
utilize triangulation on detected markers in the binocular images to determine the three-dimensional coordinate reconstruction of markers.

12. The device of claim 8, wherein the one or more processors, when determining the model fitting, are configured to:
match a subset of the three-dimensional coordinate reconstruction of markers to detected markers in the binocular images to determine the model fitting.

13. The device of claim 8, wherein the one or more processors, when determining the three-dimensional registration, are configured to:
calculate a singular-value decomposition of a derived matrix associated with the model fitting to determine the three-dimensional registration.

14. The device of claim 8, wherein the overlay visualization data is associated with an augmented reality image or video.

15. A non-transitory computer-readable medium storing a set of instructions, the set of instructions comprising:
one or more instructions that, when executed by one or more processors of a device, cause the device to:
provide, to a camera and a projector of a portable projection mapping device, first instructions for calibrating the camera and the projector;
receive, from the camera and the projector and based on the first instructions, calibration parameters for the camera and the projector;
calculate a stereo calibration between the camera and the projector based on the calibration parameters for the camera and the projector;
provide, to the camera, second instructions for recognizing a reference instrument and a digitizing probe associated with the portable projection mapping device;
receive, from the camera and based on the second instructions, binocular images;
determine a marker extraction, a marker matching, a three-dimensional coordinate reconstruction of markers, a model fitting, and a three-dimensional registration, based on the binocular images;
determine recognition parameters for recognizing the reference instrument and the digitizing probe, based on the binocular images, the marker extraction, the marker matching, the three-dimensional coordinate reconstruction of markers, the model fitting, and the three-dimensional registration;
process the recognition parameters for recognizing the reference instrument and the stereo calibration between the camera and the projector, with an optical tracking model, to generate overlay visualization data; and cause the portable projection mapping device to project a visualization on a target object based on the overlay visualization data.

16. The non-transitory computer-readable medium of claim 15, wherein the one or more instructions further cause the device to:

utilize the recognition parameters for recognizing the digitizing probe to enable a user to interact with the visualization, wherein the visualization includes one of an image or a video.

17. The non-transitory computer-readable medium of claim 15, wherein the one or more instructions, that cause the device to calculate the stereo calibration between the camera and the projector based on the calibration parameters for the camera and the projector, cause the device to:

process the calibration parameters for the camera and the projector, with a computer vision model, to calculate the stereo calibration between the camera and the projector.

18. The non-transitory computer-readable medium of claim 15, wherein the one or more instructions further cause the device to:

process the binocular images, with an optical tracking callback model, to track markers of the digitizing probe.

19. The non-transitory computer-readable medium of claim 15, wherein the one or more instructions, that cause the device to determine the marker extraction, cause the device to:

process the marker extraction, with a computer vision model, to optimize performance of the marker extraction for different scenarios.

20. The non-transitory computer-readable medium of claim 15, wherein the one or more instructions, that cause the device to determine the marker matching, cause the device to:

sort detected markers in the binocular images according to vertical positions of the detected markers and horizontal positions of the detected markers; and match the detected markers, to generate the marker matching, based on sorting the detected markers.

\* \* \* \* \*